Sept. 29, 1970          A. P. SFREDDA          3,530,742

POWER TRANSMISSION DEVICE

Filed Sept. 12, 1968

INVENTOR
ALBERT P. SFREDDA

3,530,742
POWER TRANSMISSION DEVICE
Albert P. Sfredda, 2106 Iris Place, Bethlehem, Pa. 18018
Filed Sept. 12, 1968, Ser. No. 759,468
Int. Cl. F16h *15/16, 15/50*
U.S. Cl. 74—796                               12 Claims

ABSTRACT OF THE DISCLOSURE

A variable speed power transmitting device whereby power is transmitted from a drive member to a driven member. A drive member rotates a conical roller driven member within a slightly larger raceway. Axial controlled movement between the two members varies the output speed from zero to a progressive substantial variance relative to input speed.

SUMMARY OF THE INVENTION

This present invention relates to devices for transmitting power from a drive member to a driven member. It relates particularly to a gearless variable speed power transmission device where speed ratios can be controlled to vary substantially from a neutral position to a progressive variance. It is an object of the invention to provide a transmission suitable for machinery that requires an infinitely variable range of speed ratios. The drive member roller is disposed wtihin the rimmed portion of the driven roller. Rotation of the drive roller causes a tractional engagement of the driven roller to the inner surface of a surrounding raceway and also causes the driven roller to roll on the inner surface of the raceway. This arrangement eliminates the need for preloading of the traction elements, thereby providing ease of operation and efficient transmission. Another object of this invention is to provide a speed reducing device that is simple to construct in that it has few moving parts. The above objects will become more fully apparent from the following description when taken with the attached drawings wherein:

DISCLOSURE OF THE EMBODIMENT

Figure 1:
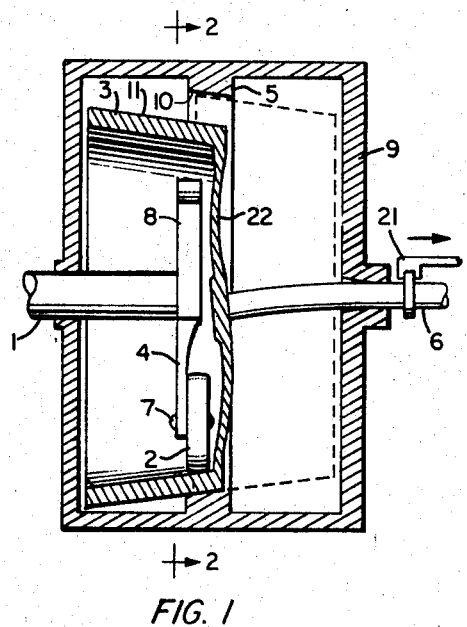
FIG. 1 is a sectional view of a variable speed power transmission.
Figure 2:
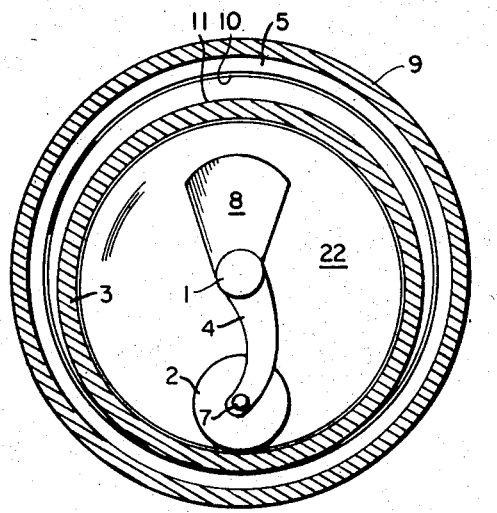
FIG. 2 is a sectional view of the variable speed transmission taken along planes indicated by view line 2—2.

Referring to FIGS. 1 and 2, the numeral 1 indicates a drive shaft. Secured to the interior end of shaft 1 is an extended arm 4 constructed of a rigid or stiff flexible material. Axle 7 is secured to outer end of arm 4 whereon roller 2 is mounted for planetary rotation. One roller is shown, however additional rollers may be employed. Counterweight 8 is secured to shaft 1 opposite roller 2. Rimmed conical roller 3 is secured to the flexible output shaft. Roller web 22 may be constructed of a flexible material. Flexible shaft 6 enables roller 3 to rotate on raceway 5. Other suitable means can be employed to connect roller 3 to a drive shaft. Roller 3 is held in contact with raceway 5 by roller 2. Contacting surfaces 10 and 11 may be covered with a friction producing material and/or may be slightly resilient. Housing 9 supports raceway 5 and shafts 1 and 6.

In operation shaft 1 produces planetary rotation of roller 2 and its own axis and rolls over the inner surface of conical roller 3. This rolling movement forces roller 3 to roll on raceway 5 at a proportionally slower rotational speed than input shaft 1, therefore output shaft 6 rotates in an opposite direction to shaft 1 at a proportionally slower speed. Axial movement of the link 21 (direction shown by arrow) progressively changes position of shaft 6 and roller 3 relative to roller 2 and shaft 1, thereby progressively changing speed ratio between the drive and driven shafts. Maximum axial movement of roller 3 (position shown by dotted lines) produces a neutral condition where no rotational movement is transmitted to roller 3. This occurs because the diameter of the engaging portion of roller 3 is equal to the inside diameter of raceway 5, thereby enabling roller 2 and shaft 1 to freely rotate without transmitting rotary motion to roller 3. Drawing shows one conical roller and one raceway, however additional members can be employed similar to the arrangement shown in FIG. 3.

Figure 3:
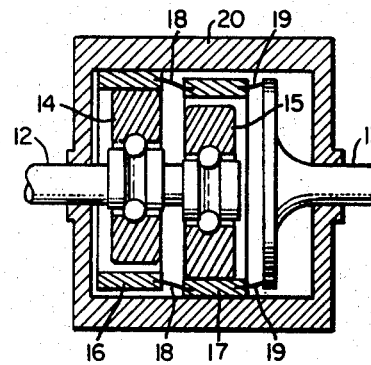
FIG. 3 is a sectional view showing a modified form of the invention.

Referring to FIG. 3, roller arrangement is shown in a speed reducing device. A set of rollers 14 and 15 are rotatably secured to shaft 12 and are diametrically opposed to each other. Two rimmed rollers 16 and 17 are disposed within race 20 in a side-by-side manner and are connected by flexible members 18. Rimmed rollers 16 and 17 are held in bearing contact with race 20 by rollers 14 and 15. Flexible members 19 connect drive shaft 13, thereby enabling accentric rotation of roller 17 relative to shaft 13. Race 20 and shafts 12 and 13 are concentric. Race 20 remains stationary. A simpler construction will operate without rimmed roller 16, flexible members 18, and roller 14. Operation of rollers is similar to transmission described in FIGS. 1 and 2. An additional stage can be employed to increase speed ratio further by securing the input shaft of a second unit, similar to the one described, to the output shaft of the first unit.

It will be obvious to those skilled in the art that many variations may be made in the embodiments chosen for the purpose of illustrating the present invention without departing from the scope thereof as defined by the appended claims.

What is claimed as invention is:

1. A power transmitting device for transmitting torque from a drive member to a driven member comprising; a drive member, a rimmed roller, said rimmed roller comprising a rigid member of progressively changing radii along the axial length thereof, said drive member engaging the inner surface of the rimmed portion of said roller, a surrounding raceway engaging said roller, means for axial movement of said roller relative to said drive member and said raceway, means for connecting said roller to a driven member whereby upon rotation of drive member rotary motion is transmitted to the driven member at a proportional rate.

2. A device as in claim 1 wherein said rimmed roller comprises a disc having an axially extended tapered flange.

3. A device as in claim 1 wherein said drive member comprises a shaft with a roller eccentrically and rigidly mounted thereto.

4. A device as in claim 1 wherein said drive member comprises a shaft with a roller eccentrically and resiliently connected thereto.

5. A device as in claim 1 wherein at least one of the engaging surfaces between said rimmed roller and said raceway is coated with a resilient material.

6. A device as in claim 1 wherein means are provided for dynamically balancing said device.

7. A device as in claim 1 wherein means for balancing said device comprise; an additional rimmed roller, means for connecting in a side-by-side manner said additional roller to said first mentioned rimmed roller, said drive member engaging said additional rimmed roller at a point diametrically opposed to the engaging point of said drive member and said first mentioned rimmed roller, said additional rimmed roller engaging said raceway.

8. A device as in claim 1 wherein means connecting said rimmed roller to a drive shaft are composed of a flexible material.

9. The device as claimed in claim 6 wherein said raceways' inside radii vary along the axial length thereof.

10. A power transmitting device for transmitting torque from a drive member to a driven member comprising; a drive shaft with a roller rigidly and eccentrically mounted thereto, a rigid rimmed roller, said drive roller engaging the inner surface of said rimmed roller, said drive roller being eccentric to said rimmed roller, a surrounding raceway engaging said rimmed roller, and means for connecting said rimmed roller to a drive member.

11. A device as in claim 9 wherein at least one of the engaging surfaces between said rimmed roller and said raceway is coated with a resilient material.

12. A power transmitting device for transmitting torque from a drive member to a driven member comprising; a drive shaft with a rigid roller resiliently connected thereto, a rigid rimmed roller having an axis parallel to said drive shaft, said drive roller engaging the inner surface of said rimmed roller, said drive roller being eccentric to said rimmed roller, a surrounding raceway engaging rimmed roller, and means for connecting rimmed roller to a driven member.

References Cited

UNITED STATES PATENTS

| | | | |
|---|---|---|---|
| 2,831,373 | 4/1958 | Weiss | 74—796 |
| 3,119,283 | 1/1964 | Bentov | 74—796 X |
| 3,148,560 | 9/1964 | Woodward | 74—796 |
| 3,160,032 | 12/1964 | Black | 74—804 |
| 3,304,809 | 2/1967 | Hellen | 74—798 |
| 3,427,898 | 2/1969 | Mayer | 74—640 |

LEONARD H. GERIN, Primary Examiner

U.S. Cl. X.R.

74—191, 805